March 19, 1968
R. D. OLIVER
3,374,004
TRASH HANDLING APPARATUS
Filed Oct. 19, 1966
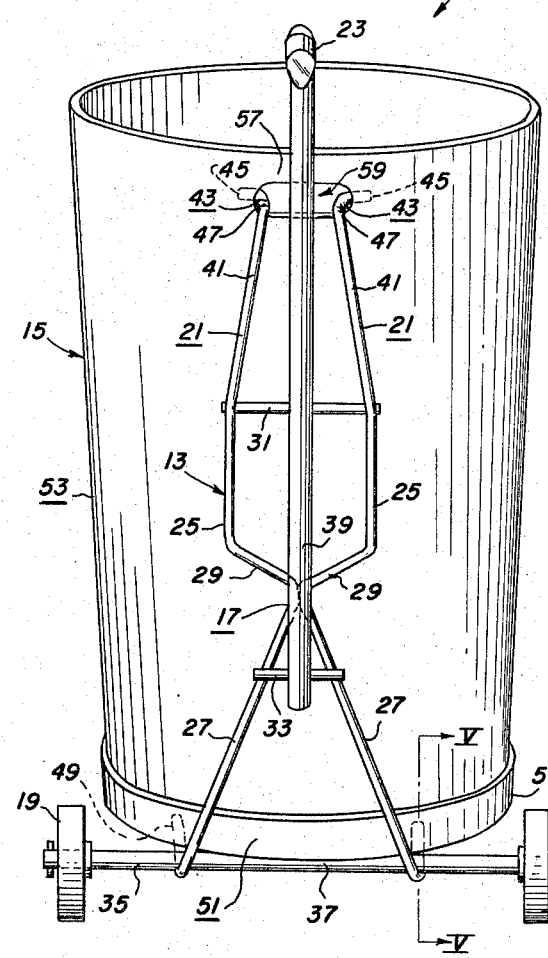
FIG. 1
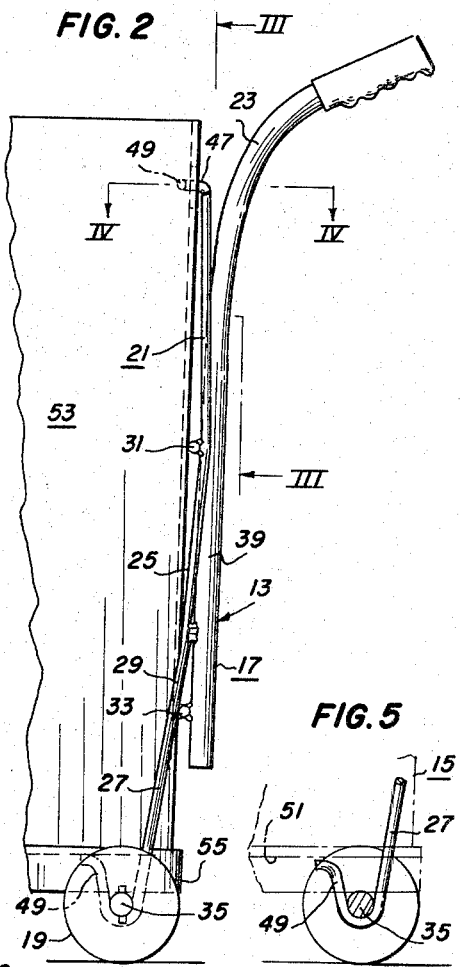
FIG. 2
FIG. 5
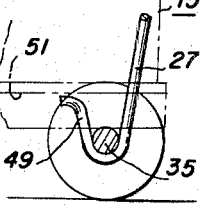
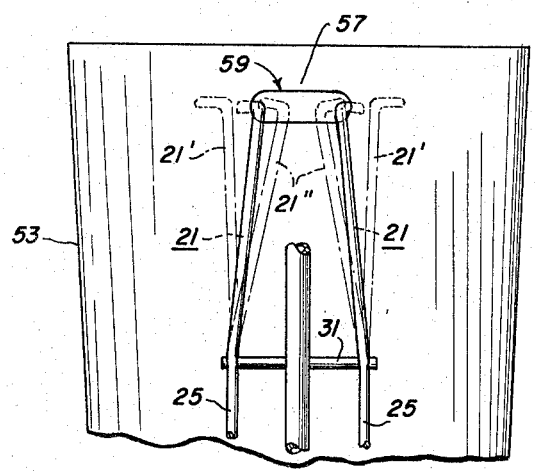
FIG. 3
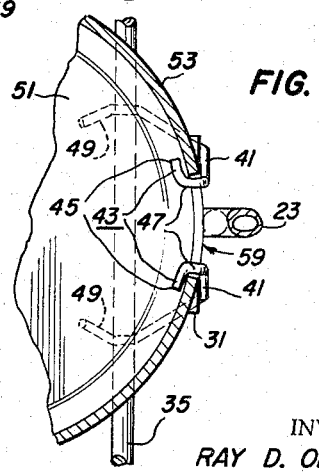
FIG. 4
INVENTOR.
RAY D. OLIVER
BY John R. Walker, II
Attorney

United States Patent Office 3,374,004
Patented Mar. 19, 1968

3,374,004
TRASH HANDLING APPARATUS
Ray D. Oliver, Rte. 3, Perryville, Mo. 63775
Filed Oct. 19, 1966, Ser. No. 587,876
5 Claims. (Cl. 280—47.26)

This invention relates to trash handling apparatus adapted for use around the home or for commercial use, and to such apparatus particularly adapted for handling small trash loads. The invention includes a hand cart and a container with each respectively having structure adapted to be correspondingly or complementarily fitted with the structure of the other. The cart includes a pair of oppositely projecting and oppositely tensioned prong parts adapted to co-actingly engage an apertured wall portion of the container. In mounting or fitting the container on the cart, the pair of prongs are squeezed together and the container is placed on the cart with the prongs extending through the apertured wall portion of the container; the pair of prongs are then released thereby allowing the prongs to spring oppositely and firmly engaging the container wall portion and securely mount the container on the cart.

An object of the invention is to provide a strong lightweight mechanically simple cart-container combination which is especially useful for handling gardening waste, leaves, grass, and for handling various other substantially light loads of material.

A further object is to provide in such cart-container trash handling apparatus means whereby the container may be quickly and easily mounted on or demounted from the cart.

A further object is to provide in such cart-container trash handling apparatus means whereby the container is firmly securable on the cart, and there is minimum likelihood the container will inadvertently fall or overturn.

A further object is to provide such trash handling apparatus which is economical to manufacture and market.

The means by which the foregoing and other objects of the present invention are accomplished and the manner of their accomplishment will be readily understood from the following specification upon reference to the accompanying drawings, in which:

FIG. 1 is a rear perspective view of the trash handling apparatus with the cart and container releasably secured together.

FIG. 2 is a side elevational view of the apparatus with the container being partially shown.

FIG. 3 is a rear elevational fragmentary view taken as on the line III—III of FIG. 2.

FIG. 4 is a horizontal plane fragmentary sectional view taken as on the line IV—IV of FIG. 2.

FIG. 5 is a vertical plane fragmentary sectional view taken as on the line V—V of FIG. 1.

Referring now to the drawings in which the various parts are indicated by numerals, the cart-container combination is indicated by numeral 11 and includes a cart 13 and a container 15.

Cart 13 includes basically upstanding support structure 17, a pair of wheels 19, a pair of oppositely projecting arm members 21, and a handle 23.

Support structure 17 provides frame means for cart 13, and provides rigid support structure interconnecting wheels 19, arm members 21 and handle 23. Although various support structure forms may be utilized without departing from the spirit and scope of the invention, that shown in the drawings and described hereinbelow is the preferred form.

Support structure 17 is symmetrically arranged and includes upper, lower and intermediate rod portions 25, 27, 29 respectively; upper and lower cross rod portions 31, 33, and an axle 35 fixed respectively to the lower end portions of lower rods 27 and upon which wheels 19 are rotatably mounted. For purposes of description, lower portion 39 of handle 23 is also considered a part of support structure 17.

Pair of arm members 21 each includes a main portion 41 and an L-shaped finger portion 32 including a prong portion 45 and a medial portion 47. L-shaped finger portions 43 of each arm member 21 is arranged substantially horizontally with the respective medial portion 47 projecting perpendicular from the upper end portion of the respective main portion 41. Pair of armed members 21 are relatively movable and are arranged with prong portions 45 projecting oppositely and generally horizontally. The main portions 41 respectively of arm members 21 are formed of spring steel stock and are resiliently flexible. Thus, the inherent resiliency of the main portions 41 provide resilient spring means for urging finger portions 43 apart. Arm members 21 are symmetrically arranged and normally sprung in opposite directions; when arm members 21 are in a dormant or at rest configuration, the respective arm members are arranged as indicated by numerals 21' in FIG. 3. Cart 13 includes a pair of horizontally spaced stud members 49 fixedly secured to and projecting generally upwardly from axle center portion 37 of support structure 17.

Container 15 is generally barrel shaped with an open upper end and includes a bottom portion 51 and a body portion 53. A downturned rim portion 55 extends around the periphery of bottom portion 51. The upstanding circumferentially exending body portion 53 of container 15 includes a wall portion 57 defining a horizontally elongated opening 59.

When the user of apparatus 11 desires to mount container 15 on cart 13, the following simple procedure is carried out: With one hand, the user squeezes arm members 21 together and to the relative arrangement indicated by numeral 21" in FIG. 3; while holding arm members 21 in such an arrangement, with his other hand the user places rim portion 55 of container 15 over upstanding stud members 49 and rocks the container on the cart to a position with finger portions 43 extending through aperture 59; arm members 21 are then released thereby allowing finger portions 43 to spread and firmly engage container wall portion 57 and securely mount the container on the cart. The reverse of the above-described procedure is substantially carried out when it is desired to remove the container from the cart.

The cart-container trash handling apparatus of the present invention is strong, lightweight and mechanically simple; it requires minimum maintenance. The container may be quickly and easily mounted on or demounted from the cart and the mounted container is held securely. The invention provides a very useful cart-container combination for handling light loads of material.

Although the present invention has been described with reference to a preferred embodiment, it will be understood that it is not to be so limited since changes and modifications may be made therein which are within the full intended scope of this invention as hereinafter claimed.

I claim:
1. Trash handling apparatus comprising a cart and a container; said cart including upstanding support structure, ground engageable wheel means rotatably mounted on the lower portion of said support structure, handle means fixed on the upper portion of said support structure, a pair of substantially short oppositely projecting generally horizontal prong portions individually movably supported from said support structure and spring means for yieldably urging said pair of prongs apart and sub- stantially in opposite directions, said pair of prongs being adapted to be manually manipulated simultaneously equidistantly between a first arrangement in which said pair of prongs are arranged substantially together and a second arrangement in which said pair of prongs are arranged substantially apart; said container being generally barrel shaped and including a bottom portion and an upstanding circumferential walled body portion including a vertical wall portion defining a horizontally elongated through opening, said container being removably fitted on said cart with said oppositely projecting prongs being arranged in said second arrangement and extending through said elongated opening and engaging said vertical wall portion.

2. A trash handling apparatus as defined in claim 1 in which said cart includes a pair of upwardly projecting stud members horizontally spaced apart and secured on said support structure, and in which said bottom portion of said container includes a downturned rim portion; said container being adapted to be fitted on said cart with said downturned rim portion snugly engaging said pair of studs.

3. Trash handling apparatus comprising a cart and a container; said cart including upstanding support structure, ground engageable wheel means rotatably mounted on the lower portion of said support structure, and handle means fixed on the upper portion of said support structure, a pair of generally upright arm members, each member being secured respectively at the lower end portion thereof to said support structure and each including an L-shaped finger portion including a short horizontal prong portion, said pair of arm members being relatively movable and arranged with said prong portions projecting oppositely and generally horizontally, and spring means for resiliently urging said finger portions apart and substantially in opposite directions, said pair of finger portions being adapted to be manually manipulated equidistantly between a first arrangement in which said finger portions are arranged substantially together and a second arrangement in which said finger portions are arranged substantially apart; said container being generally barrel shaped and including a bottom portion and an upstanding circumferential walled body portion including a vertical wall portion defining a horizontally elongated through opening, said container being removably fitted on said cart with said finger portions of said pair of arms being arranged in said second arrangement and engaged with said vertical wall portion of said container.

4. A trash handling apparatus as defined in claim 3 in which said cart includes a pair of upwardly projecting stud members horizontally spaced apart and secured on said support structure, and in which said bottom portion of said container includes a downturned rim portion; said container being adapted to be fitted on said cart with said downturned rim portion snugly engaging said pair of studs.

5. Trash handling apparatus comprising a cart and a container; said cart including upstanding support structure, ground engageable wheel means rotatably mounted on the lower portion of said support structure, handle means fixed on the upper portion of said support structure, a pair of generally upright arm members, each arm member including a substantially long resiliently flexible main portion and an L-shaped finger portion including a prong portion and a medial portion, each arm member being fixedly secured at the lower end portion of said main portion to said upright support structure, said pair of arm members being disposed with said prong portions projecting generally oppositely and with the resiliently flexible main portion yieldably displacing said finger portions apart, said pair of finger portions being adapted to be manually manipulated simultaneously equidistantly between a first arrangement in which said pair of finger portions are arranged substantially together and a second arrangement in which said pair of finger portions are arranged substantially apart; said container being generally barrel shaped and including a bottom portion and an upstanding circumferential walled body portion including a vertical wall portion defining a horizontally elongated through opening, said container being removably fitted on said cart with said finger portions of said pair of arms being arranged in said second arrangement and engaged with said vertical wall portion of said container.

References Cited

UNITED STATES PATENTS

| | | | |
|---|---|---|---|
| 2,784,856 | 3/1957 | Jordan | 214—383 |
| 3,008,595 | 11/1961 | Lokeran et al. | 214—383 |
| 3,275,175 | 9/1966 | Arnold | 214—383 |
| 3,278,061 | 10/1966 | Christensen | 214—383 |

LEO FRIAGLIA, *Primary Examiner.*

L. D. MORRIS, *Assistant Examiner.*